United States Patent [19]
Sykes et al.

[11] 3,967,547
[45] July 6, 1976

[54] APPARATUS FOR COOKING AND SMOKING FOOD

[76] Inventors: James Max Sykes; Velma T. Sykes, both of 3227 Bullard St., Paducah, Ky. 42001

[22] Filed: Nov. 14, 1975

[21] Appl. No.: 632,122

Related U.S. Application Data

[63] Continuation of Ser. No. 478,413, June 11, 1974, abandoned.

[52] U.S. Cl............................... 99/421 H; 99/446; 99/473; 126/19 R; 126/273 R; 426/314; 426/315; 426/523
[51] Int. Cl.² ........................................... A47J 27/00
[58] Field of Search.......... 99/446, 339, 340, 443 R, 99/444, 446, 473, 421 H; 426/314, 315, 523, 465, 466, 467; 126/21, 21 R, 21 A, 19, 273 R, 25 A

[56] References Cited
UNITED STATES PATENTS

| | | | |
|---|---|---|---|
| 2,558,569 | 6/1951 | Koch | 99/443 R |
| 2,568,022 | 9/1951 | Parker | 99/473 |
| 2,722,883 | 11/1955 | Righell | 99/446 X |
| 2,797,633 | 7/1957 | Goodwin | 126/25 A |
| 3,098,428 | 7/1963 | Maxwell | 99/446 |
| 3,568,590 | 3/1971 | Grice | 99/446 |

*Primary Examiner*—S. Leon Bashore
*Assistant Examiner*—Kenneth M. Schor
*Attorney, Agent, or Firm*—Beveridge, DeGrandi, Kline & Lunsford

[57] ABSTRACT

A cooking and smoking apparatus for food products comprising two distinct chambers with common outer walls, and interior walls, spaced from the outer walls, containing a plurality of openings. The spaces between the walls form ducts or air passages which allow smoke and heat to rise from a lower combustion chamber and enter an upper cooking chamber through said openings in the interior walls. Adjustable dampers in the ducts control the amount of smoke and heat entering the cooking chamber, while additional dampers control the air entering the combustion chamber and combustion products being vented from the apparatus through a chimney. One or more access doors is provided in each of the combustion and cooking chambers. The cooking chamber is provided with a flush pan or the like at the bottom thereof connected to a drain pipe to permit flushing of the cooking chamber.

4 Claims, 4 Drawing Figures

U.S. Patent   July 6, 1976   Sheet 1 of 2   3,967,547
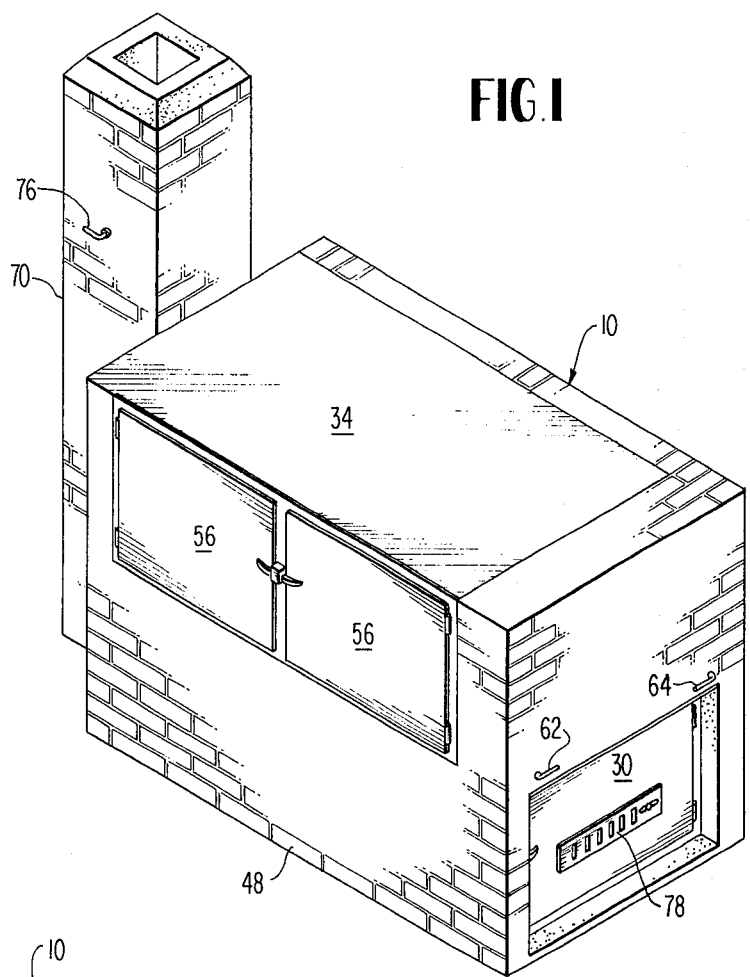
FIG.1
FIG.2
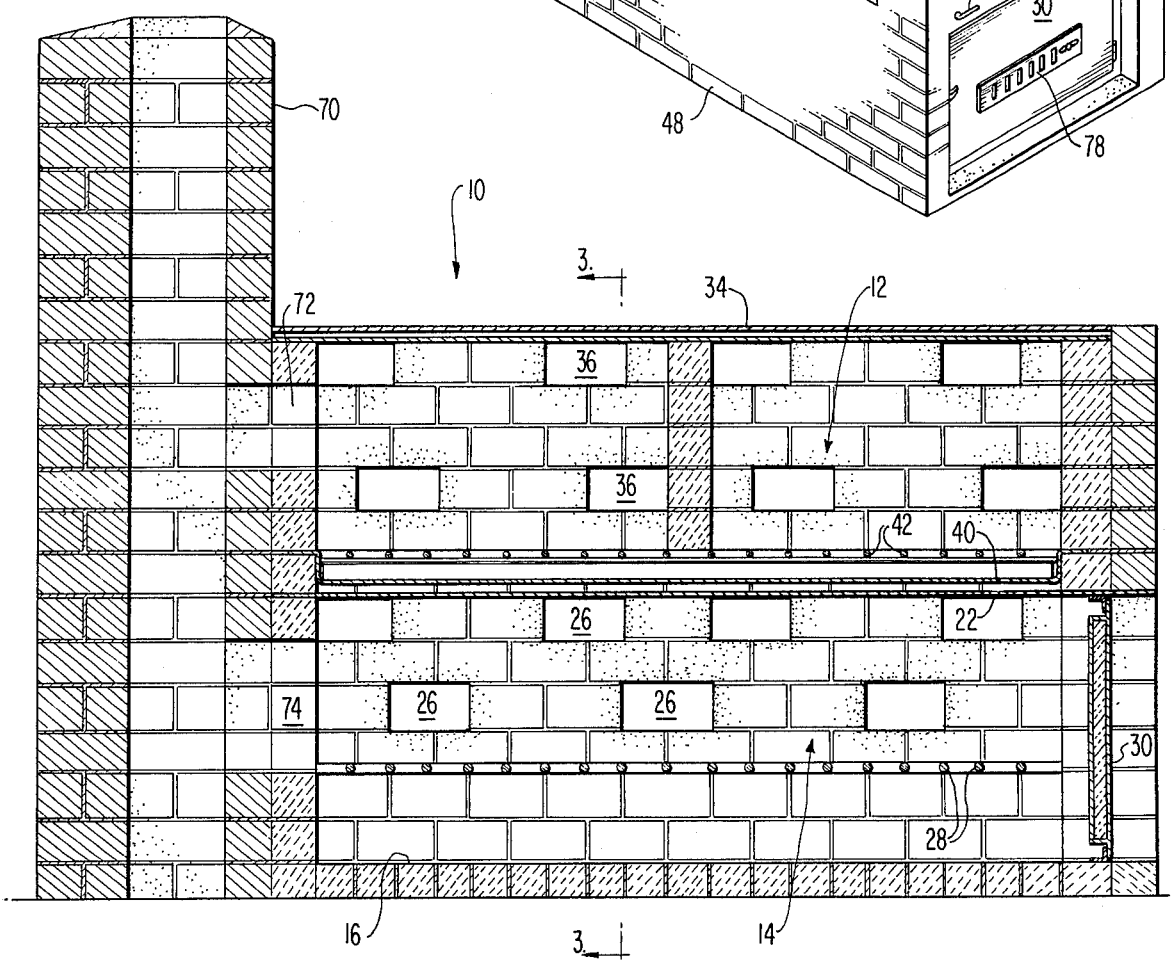

APPARATUS FOR COOKING AND SMOKING FOOD

This is a continuation of application Ser. No. 478,413 filed June 11, 1974 and now abandoned.

BACKGROUND OF THE INVENTION

This invention relates to a novel and improved method and apparatus for cooking and smoking food, commonly known as barbecuing. Although not limited thereto, the present invention is particularly suitable to cooking with wood such as hickory logs, for example, to impart a certain desirable taste to the food.

Devices for cooking and smoking meats and related food products are well known in the art. They extend in size from backyard barbecue devices to large commercial barbecue pits and the like. An inherent disadvantage with most barbecue devices is that while the meat is being cooked and/or smoked drippings from the meat are allowed to fall into the fire, thereby causing undesirable burnt smoke to envelope the meat product and impart an undesirable burnt flavor thereto.

Other apparatuses, such as disclosed in U.S. Pat. No. 3,656,140 and U.S. Pat. No. 3,683,791, have attempted to eliminate this problem by providing shields between the cooking product and the fire, or situating the fire to the sides of the cooking product so that the fire is partially independent of the food being cooked and smoked. However, these apparatuses provide only limited control of the heat and smoke transmitted to the food product, and there still exists the likelihood that excess fat or meat-juice drippings will accidentally enter the fire and produce undesirable smoke fumes.

It is therefore a primary object of the present invention to provide a cooking and smoking method and apparatus free of the above drawbacks.

A further primary object of the present invention is to provide a method and apparatus for cooking and curing meat wherein the meat is uniformly cooked and retains all moisture and natural juices to impart the utmost in taste to the food.

A more specific object of the present invention is to provide a cooking and smoking apparatus wherein combustion is completely separated from the food being cooked to obviate undesirable fumes caused from food drippings entering the area of combustion. At the same time the apparatus permits the heat and smoke of combustion to be imparted to the food under regulation and control in order to impart a desired taste to the food.

SUMMARY OF INVENTION

In achieving the above and other objects, the present invention utilizes two distinct chambers, preferably situated one above the other. The lowest chamber is a combustion chamber and is separated from the upper cooking chamber by a steel plate or the like extending the entire width and length of the chambers. A plurality of openings along the side walls of the combustion chamber allow smoke and heat to rise therefrom and enter the upper cooking chamber through like openings in the side walls. Outer walls are spaced from the side walls and form ducts which guide the passage of smoke and heat from the combustion chamber to the cooking chamber. Adjustable controls in the ducts regulate the amount of heat and smoke entering the cooking chamber. A chimney is located at the rear of the apparatus to allow excess products of combustion to exit from the combustion chamber, as well as spent smoke to exit from the cooking chamber. A damper in the chimney, and draft control in the combustion chamber regulate the amount of air entering the apparatus and spent combustibles exiting through the chimney. One or more access doors are provided in each of the combustion and cooking chambers. The cooking chamber is provided with a flush pan or the like at the bottom thereof connected to a drain pipe to permit flushing of the cooking chamber.

These and other features and advantages of the present invention will become more evident from the following detailed description, taken in connection with the accompanying drawings in which:

DRAWINGS

FIG. 1 is a perspective view of a cooking and smoking apparatus embodying the invention showing basic exterior features thereof;

FIG. 2 is a longitudinal cross-sectional view of the apparatus of FIG. 1;

DETAILED DESCRIPTION OF THE PREFERRED EMBODIMENTS

Figure 3:
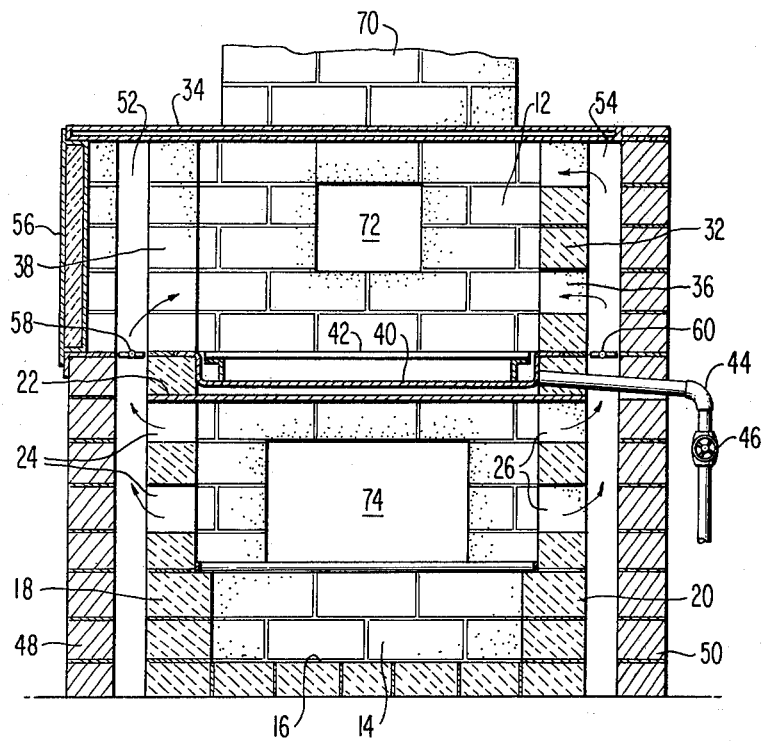
FIG. 3 is a cross-sectional view taken along lines 3—3 of FIG. 2.

According to the method employed in the present invention, meat is cooked in oven apparatus including two distinct chambers preferably situated one above the other. A fire is constructed preferably from hickory logs to produce desired heating and smoking characteristics in the lower chamber which is termed a combustion chamber, and smoke and heat is directed to the upper chamber, which is the cooking chamber, through openings or ports in the walls of the chambers. The smoke and heat is directed to the cooking chamber through ducts communicating with said ports. Drippings of meat juices or fat are collected in the bottom of the cooking chamber, during the cooking operation and are periodically withdrawn from the cooking chamber. The resulting meat product retains its moisture and has a savory flavor free of any burnt grease taste. Moreover, it is uniformly cooked with all natural juices retained.

Turning now to the drawings, there is illustrated a cooking and smoking apparatus generally at 10 embodying the present invention and which may be employed to carry out the above method. The exterior shell is of a conventional rectangular design and preferably constructed of brick and mortar or the like. Contained within apparatus 10 are a cooking chamber, shown generally at 12, and a combustion chamber, shown generally at 14 situated below the cooking chamber. Though shown rectangular in configuration, it should be obvious that the apparatus and/or chambers can be oval, circular, etc.

Combustion chamber 14 comprises a floor 16, side walls 18 and 20, and a plate 22 which completely separates the combustion chamber 14 from cooking chamber 12. A plurality of ports 24 are located in side wall 18, and a plurality of ports 26 are located in side wall 20. Also located within combustion chamber 14 is a fire grate 28 for the support of the combustible fuels to be employed in the apparatus. For entry into the combustion chamber, an insulated door 30 is provided.

Cooking chamber 12 is disposed directly above combustion chamber 14, and in part comprises side wall 32 and insulated top 34. A plurality of ports 36 are formed in side wall 32 while opposite side wall 32 is opening 38 directly above side wall 18 of combustion chamber 14. Also contained within cooking chamber 12 is a flush pan or receptacle 40 which extends the entire length and width thereof and forms a containment for liquids. Supported in receptacle 40 is a grate 42. Receptacle 40 is also provided with a drain pipe 44 with exterior adjustable valve means 46.

When meat is being cooked and smoked in cooking chamber 12, a portion of the meat juices and fat will fall therefrom. These juices can be collected in receptacle 40 which preferably will be filled with water in order to provide moisture in cooking chamber 12, or can fall into one or more removable water pans supported on grate 42 during cooking. These pans can then be removed from cooking chamber 12 and emptied after the food product has been cooked to satisfaction. Additionally, receptacle 40 and drain pipe 44 form a convenient means to allow cleaning of cooking chamber 12 with a high pressure steaming device, thereby ensuring maximum cleanliness of the cooking chamber.

Cooking and smoking apparatus 10 also includes exterior walls 48 and 50 separated from the cooking and combustion chambers by ducts or air passages 52 and 54, respectively. Exterior wall 48 includes one or more doors 56 for entry into cooking chamber 12. To regulate the amount of heat and smoke entering cooking chamber 12, adjustable controls 58 and 60 are employed in ducts 52 and 54, respectively. Adjustable control 58 is operated by a handle 62, while adjustable control 60 is operated by a handle 64.

At the rear of cooking and smoking apparatus 10 is located chimney 70 which communicates with cooking chamber 12 via port 72 and combustion chamber 14 via port 74. To control the egress of smoke from the cooking apparatus, adjustable damper 76 is located in the flue of chimney 70. Additionally, and cooperating with adjustable damper 76, is a further adjustable damper 78 located in door 30 of the apparatus. By suitably adjusting dampers 76 and 78, the heat emanating from combustion chamber 14, as well as quantities of smoke, can be adjusted as necessary.

Figure 4:
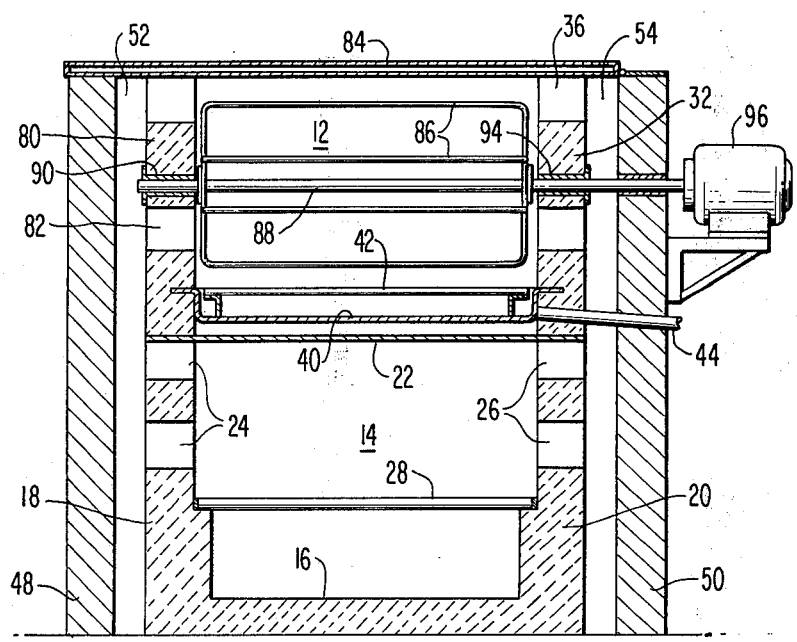
FIG. 4 is a view similar to FIG. 3 of a modification of the invention employing a rotisserie.

Turning now to FIG. 4, depicted is a device similar to that of FIGS. 1 through 3, with the exception that opening 38 has been replaced by a further wall section 80 and wall 48 extends the entire height and width of apparatus 10. Similar to side wall 32, wall 80 is provided with a plurality of ports 82 to allow the ingress of smoke and heat from duct 52. Additionally, insulated top 34 has been replaced by hinged top 84 to allow entry into cooking chamber 12.

For support of products to be cooked, located within cooking chamber 12 is a cage-like apparatus 86 mounted on shaft 88 for rotation within the cooking chamber. Shaft 88 extends through walls 80 and 32 and is mounted in bearing means 90 and 94, respectively. Shaft 88 also extends through wall 50 and is connected to motor 96. Although only one rotisserie device is connected to motor 96, it should be obvious that a plurality of rotisserie devices could be used within cooking chamber 12, all being connected in combination to motor 96, or connected to separate motors.

Not illustrated, but useful within cooking chamber 12, is a plurality of wire racks or shelves which can be mounted at varying heights therein for holding food products to be cooked and smoked. Also not illustrated, and described above, a plurality of removable water pans can be employed within cooking chamber 12, resting upon grate 42, for providing moisture to cooking chamber 12 and also catching excess drippings from the cooking food products, should receptacle 40 not be employed for this purpose.

Various changes may be made to the forms of the invention herein shown and described without departing from the spirit of the invention or the scope of the following claims.

We claim:

1. In a barbecue pit of the type including a cooking chamber and a separate fire chamber located below the cooking chamber with the two chambers being interconnected for the passage of heat, air and smoke from the fire chamber to the cooking chamber, and a flue for permitting the escape of gases from the pit, the improvement comprising outer masonry walls defining the side walls and end walls of the barbecue pit, top and bottom walls cooperating with said outer masonry walls to define the interior of said pit, inner masonry walls spaced from said outer side walls, said inner walls extending to said end walls and defining the side walls of said fire chamber and said cooking chamber, a generally horizontal partition wall extending between said end walls and said inner walls separating said fire box and said cooking chamber, a plurality of openings in said inner walls providing communication between said fire chamber and the space between said inner and said outer walls and communication between said space and said cooking chamber, said openings and said space defining duct means connecting said fire chamber and said cooking chamber, adjustable damper means in said duct means for controlling the flow of hot gases from said fire chamber to said cooking chamber, vent means directly connecting said fire chamber to said flue and second vent means directly connecting said cooking chamber to said flue, at least one fire door leading through said masonry walls into said fire chamber, and at least one access door leading through said walls into said cooking chamber.

2. The barbecue pit as defined in claim 1 further comprising damper means for controlling the rate of cooking within the barbecue pit.

3. The barbecue pit as defined in claim 1 further comprising rotisserie means within said cooking chamber for mounting food therein, said rotisserie means including at least one rod passing through at least one inner and outer wall of said cooking chamber, and motor means mounting exteriorily of said barbecue pit and operatively connected to said at least one rod member for rotation thereof.

4. The barbecue pit as defined in claim 1 further comprising an open-top drip pan mounted within the bottom portion of said cooking chamber, drain conduct means connected to said drip pan and extending from said cooking chamber out through one of said outer masonry walls, and valve means outside said outer masonry walls for closing said drain conduct means.

* * * * *